US012689881B2

(12) United States Patent
Tseng et al.

(10) Patent No.: US 12,689,881 B2
(45) Date of Patent: Jul. 21, 2026

(54) METHOD FOR REDUCING TRAFFIC OF BOOTSTRAP PROCEDURE IN G3-PLC NETWORKS

(71) Applicant: Hangzhou Lianxintong Semiconductor Co., Ltd., Hangzhou City (CN)

(72) Inventors: Yu-Liang Tseng, Zhubei City (TW); Jie-Min Cao, Zhubei City (TW)

(73) Assignee: HANGZHOU LIANXINTONG SEMICONDUCTOR CO., LTD., Hangzhou City (CN)

( * ) Notice: Subject to any disclaimer, the term of this patent is extended or adjusted under 35 U.S.C. 154(b) by 317 days.

(21) Appl. No.: 18/682,224

(22) PCT Filed: Nov. 30, 2021

(86) PCT No.: PCT/CN2021/134302
§ 371 (c)(1),
(2) Date: Feb. 8, 2024

(87) PCT Pub. No.: WO2023/015777
PCT Pub. Date: Feb. 16, 2023

(65) Prior Publication Data
US 2025/0031024 A1 Jan. 23, 2025

(30) Foreign Application Priority Data
Aug. 11, 2021 (CN) .......................... 202110918665.0

(51) Int. Cl.
*H04W 8/00* (2009.01)
*H04B 17/318* (2015.01)
(Continued)

(52) U.S. Cl.
CPC .......... *H04W 8/005* (2013.01); *H04B 17/318* (2015.01); *H04L 5/00* (2013.01);
(Continued)

(58) Field of Classification Search
CPC ... H04W 8/005; H04W 40/244; H04W 40/22; H04W 48/08; H04W 48/16; H04B 17/318; Y02D 30/70; H04L 5/00; H04L 5/0053
See application file for complete search history.

(56) References Cited

U.S. PATENT DOCUMENTS 10,419,293 B1 * 9/2019 She .......................... H04L 41/12
2011/0305142 A1 12/2011 Lu
(Continued)

FOREIGN PATENT DOCUMENTS

CN 103974203 A 8/2014
CN 104320411 A 1/2015
(Continued)

*Primary Examiner* — Angela Widhalm De Rodriguez
(74) *Attorney, Agent, or Firm* — MUNCY, GEISSLER, OLDS & LOWE, P.C.

(57) ABSTRACT

A method for reducing traffic of a bootstrap procedure in G3-PLC networks includes: a network domain having a first relay node (LBA); and a first external node (LBD) and enabling a beacon request transmission trickle mechanism according to a network domain search request (ADPM-DISCOVERY.request) instruction; wherein after the first relay node receives a first beacon request, the first relay node enables a beacon transmission trickle mechanism according to the first beacon request.

9 Claims, 6 Drawing Sheets

(51) Int. Cl.

| | | |
|---|---|---|
| *H04L 5/00* | (2006.01) |
| *H04W 40/22* | (2009.01) |
| *H04W 40/24* | (2009.01) |
| *H04W 48/08* | (2009.01) |
| *H04W 48/16* | (2009.01) |

(52) U.S. Cl.
CPC ........... *H04L 5/0053* (2013.01); *H04W 40/22* (2013.01); *H04W 40/244* (2013.01); *H04W 48/08* (2013.01); *H04W 48/16* (2013.01)

(56)   References Cited

U.S. PATENT DOCUMENTS

2015/0200714 A1* 7/2015 Hui ........................ H04B 3/544
375/257
2018/0167309 A1* 6/2018 Teboulle ............... H04L 45/122

FOREIGN PATENT DOCUMENTS

| | | | |
|---|---|---|---|
| CN | 107852369 A | 3/2018 |
| CN | 108684030 A | 10/2018 |
| CN | 112469102 A | 3/2021 |
| CN | 112822723 A | 5/2021 |
| WO | WO2018025602 A1 | 2/2018 |

* cited by examiner

LBA1~LBAN

J1

METHOD FOR REDUCING TRAFFIC OF BOOTSTRAP PROCEDURE IN G3-PLC NETWORKS

BACKGROUND OF THE INVENTION

Field of the Invention

This disclosure relates to a method for reducing traffic of the bootstrap procedure in networks, and more particularly to a method for reducing traffic of the bootstrap procedure in G3-PLC networks.

Description of the Related Art

FIG. 1 is a schematic view showing an embodiment of a conventional bootstrap procedure in G3-PLC networks. Referring to FIG. 1, if there are multiple joining nodes J1 to JN intending to join the same network domain in the prior art, then the nodes J1 to JN broadcast beacon requests within a period to perform a bootstrap procedure, and the data traffic in the zone significantly increases in a short period of time, thereby causing that other message exchange cannot be effectively sent and received, and this condition is referred to as a beacon request storm.

FIG. 2 is a schematic view showing an embodiment of another conventional bootstrap procedure in G3-PLC networks. Similarly, referring to FIG. 2 of the prior art, if there is a node J1 intending to join the same network domain and the node J1 has broadcasted the beacon request to the neighboring N relay nodes LBA1 to LBAN in this network domain to perform the bootstrap procedure, then the relay nodes LBA1 to LBAN receive the beacon request from the node J1 at the same time. At this time, the relay nodes LBA1 to LBAN broadcast similar beacons in response to the beacon request sent from the node J1 in a short period of time. In this case, other message exchange cannot be effectively sent and received, and this is referred to as a beacon storm.

BRIEF SUMMARY OF THE INVENTION

An objective of this disclosure is to solve the problem of the beacon request storm.

Another objective of this disclosure is to solve the problem of the beacon storm.

This disclosure provides a method for reducing traffic of a bootstrap procedure in G3-PLC networks. The method includes: in a network domain, there are a first relay node (LBA); and a first external node (LBD) and external nodes enable a beacon request transmission trickle mechanism when a network domain search request (ADPM-DISCOVERY.request) instruction is triggered: wherein after the first relay node has received a first beacon request, the first relay node enables a beacon transmission trickle mechanism according to the first beacon request.

DETAILED DESCRIPTION OF THE INVENTION

Symbol description: external node LBD, and LBD1~LBDN; relay node LBA and LBA1~LBAN: and step S401~S407 and S601~S608.

Figure 1:
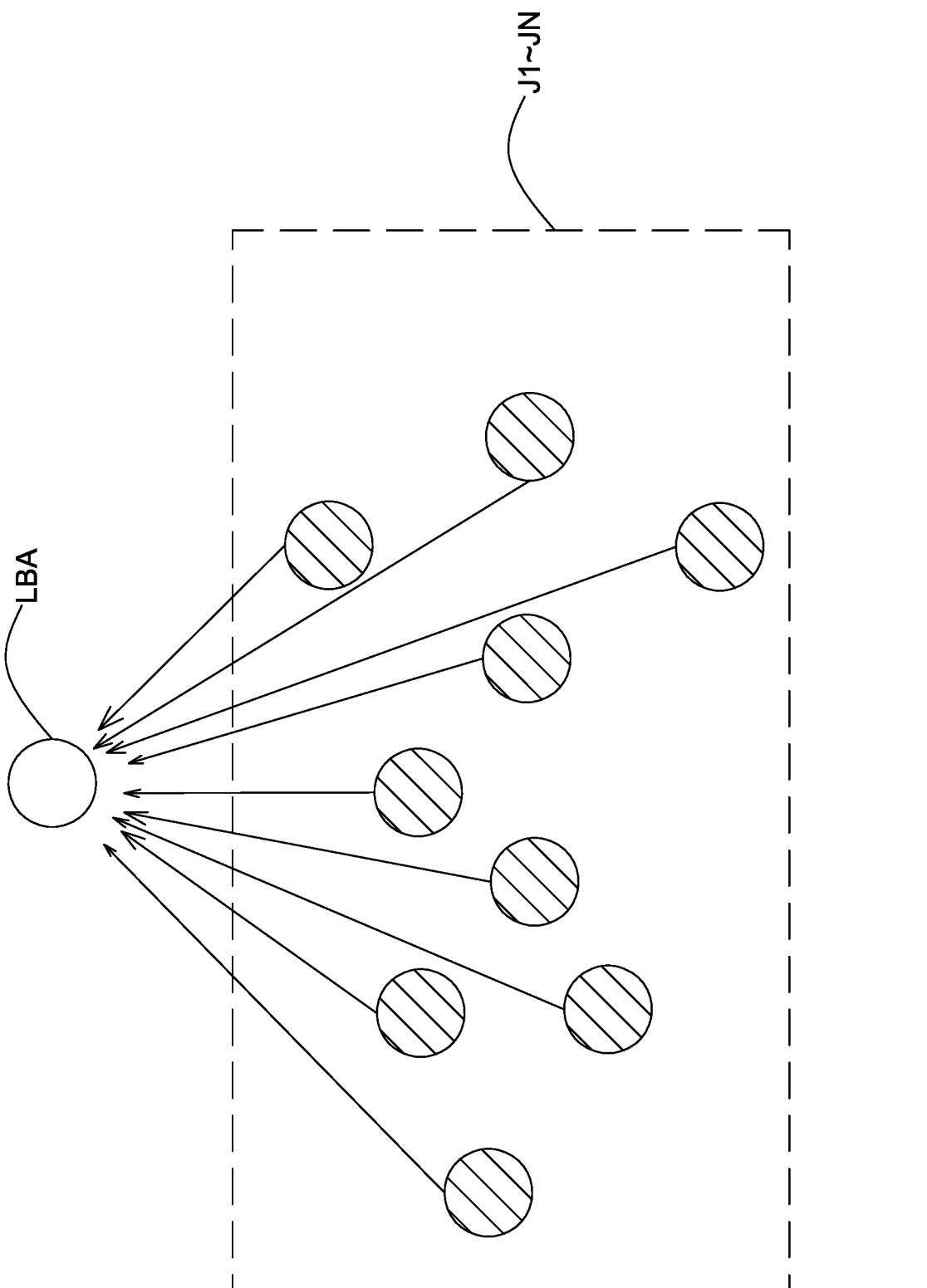
FIG. 1 is a schematic view showing a beacon request storm of a conventional bootstrap procedure in G3-PLC networks.
Figure 2:
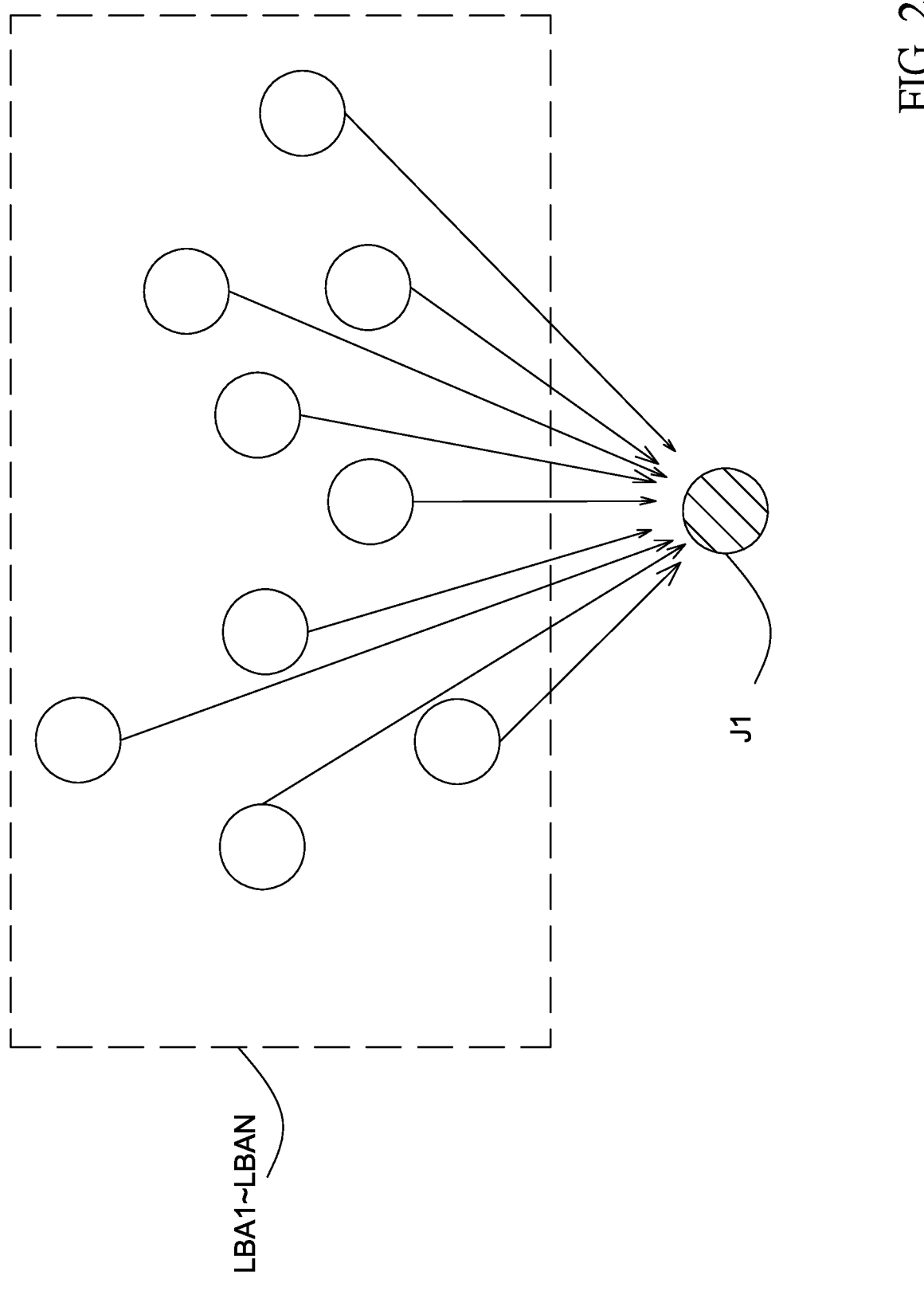
FIG. 2 is a schematic view showing a beacon storm of the conventional bootstrap procedure in G3-PLC networks.
Figure 3:
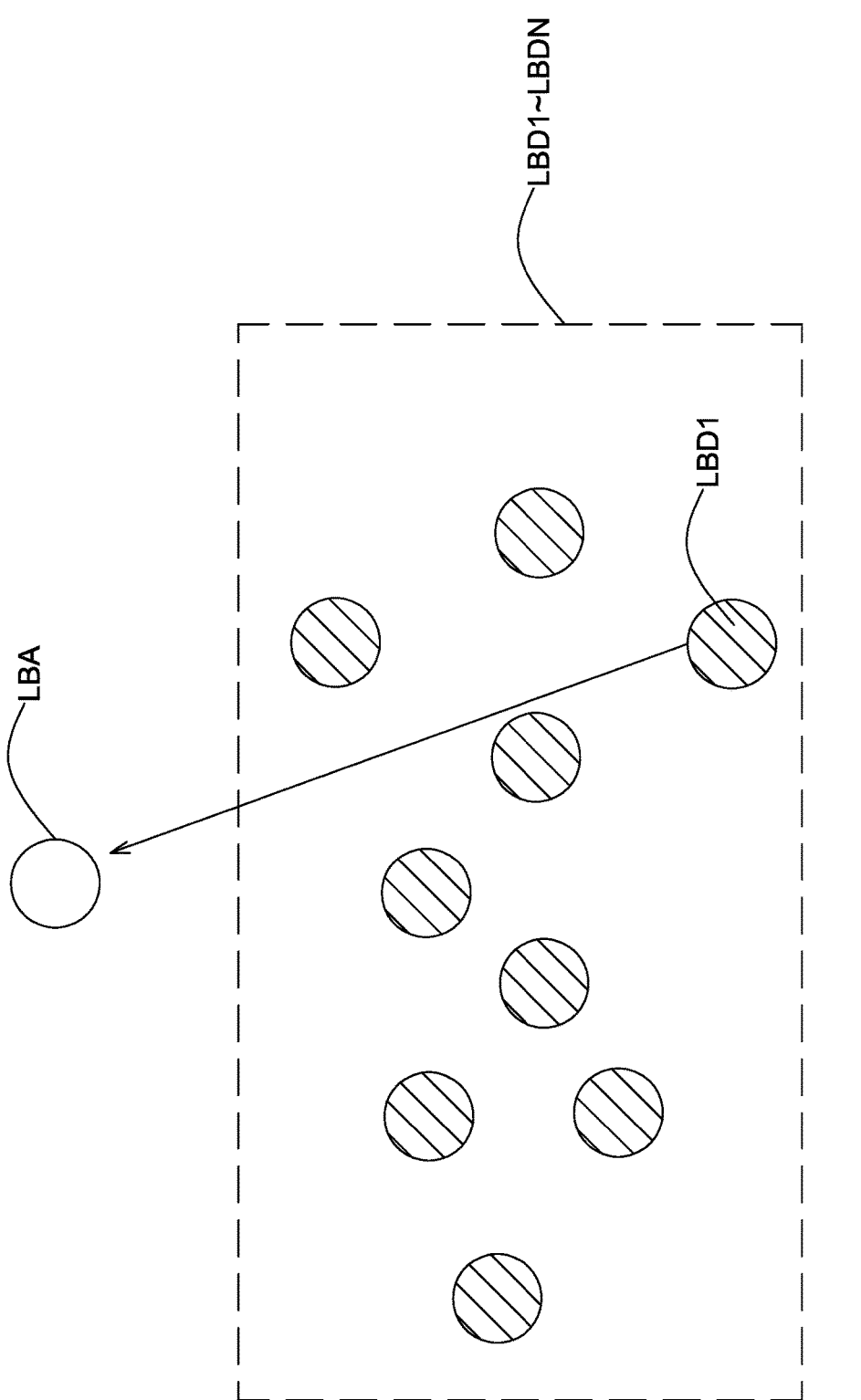
FIG. 3 is a schematic view showing an improved beacon request storm of a bootstrap procedure in G3-PLC networks according to an embodiment of this disclosure.
Figure 4:
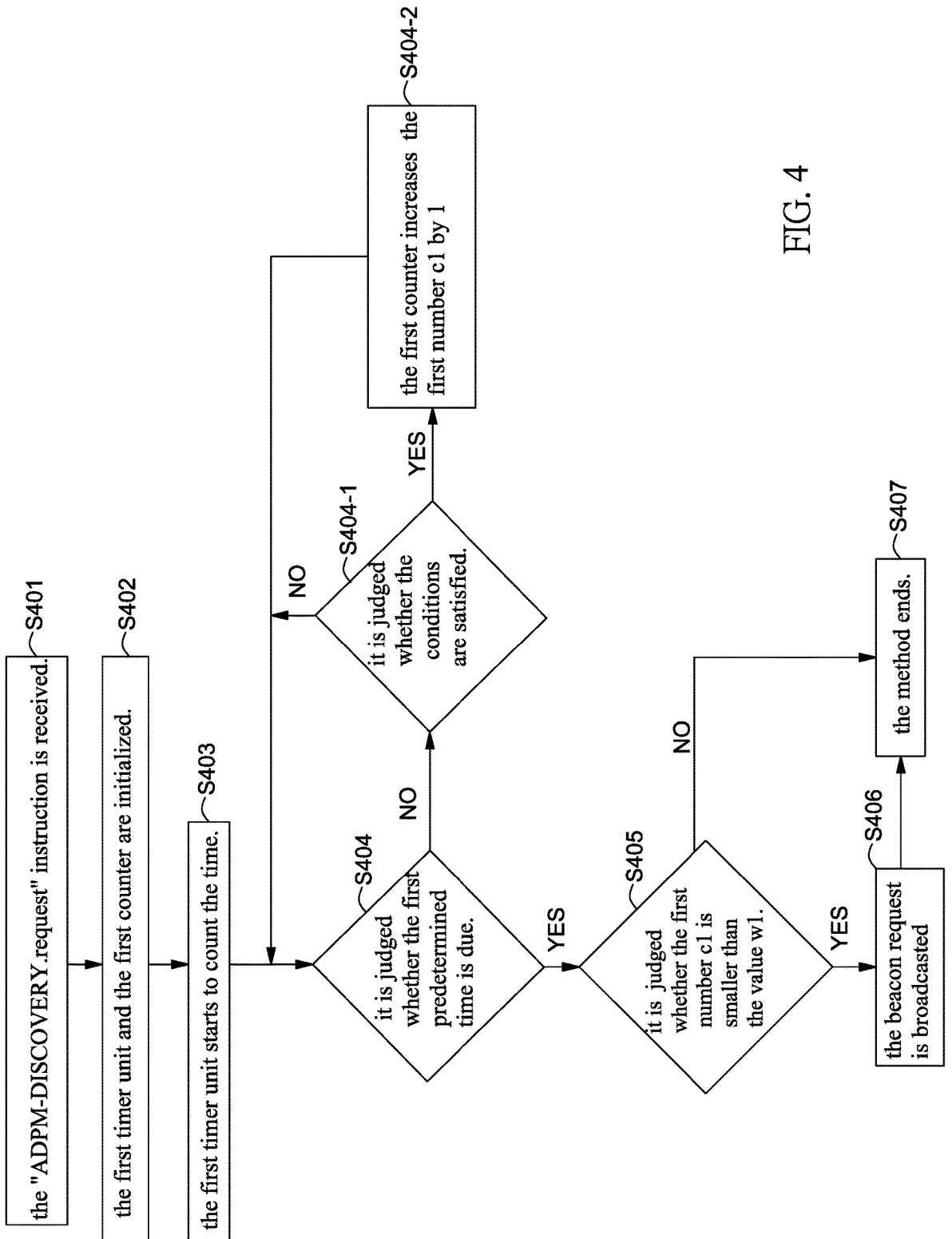
FIG. 4 is a schematic view showing a beacon request transmission trickle mechanism.

Please refer to FIGS. 3 and 4. FIG. 3 is a schematic view showing an improved beacon request storm of a bootstrap procedure in G3-PLC networks according to an embodiment of this disclosure. FIG. 4 is a schematic view showing a beacon request transmission trickle mechanism. FIG. 3 depicts N external nodes LBD1 to LBDN, and only the first external node LBD1 is explained for the sake of conciseness, wherein the external node of this disclosure is defined as a node which has not yet joined this network domain.

This disclosure provides a method for reducing traffic of a bootstrap procedure in G3-PLC networks. The method includes: a network domain M1, wherein there is a relay node LBA in the network domain M1. When the first external node LBD1 wants to join the network domain M1, an adaptation sub-layer (not shown) of the first external node LBD1 receives a network domain search request instruction from an upper layer (not shown), and then the first external node LBD1 enables a beacon request transmission trickle mechanism according to the network domain search request instruction.

In one embodiment, the step of the beacon request transmission trickle is executed by a beacon request transmission trickle module, and the network domain search request instruction is implemented by "ADPM-DISCOVERY.request instruction" in the existing G3-PLC networks. When the beacon request transmission trickle mechanism is enabled, the first external node LBD1 quotes the ADPM-DISCOVERY.request instruction, a first timer unit and a first counter in the first external node LBD1 are initialized, and the first timer unit is set to a first predetermined time T1. The first predetermined time T1 is a first random value ranging from 0 to the response time multiplied by K1 ($T1=random[0,$ ADPM-DISCOVERY.request.duration*K1]), where the response time is the time corresponding to the network domain search request instruction of the first external node LBD1. In one embodiment, the response time corresponding to the network domain search request instruction is implemented by the "ADPM-DISCOVERY.request.duration" parameter in the existing G3-PLC networks; and the range of K1 is from 0.4 to 0.6. In one embodiment, the transmission trickle module is executed by the adaptation sub-layer.

Before the first predetermined time T1 is counted down to zero and when the following conditions are both satisfied in the first external node LBD1, the first counter counts the number of the beacon requests received by the first external node LBD1, wherein the beacon requests are broadcasted from neighboring external nodes LBD2 to LBDN, and the first counter set a first number c1 to the counted number: where the conditions (a) and (b) to be satisfied are described in the following.

(a) The first external node LBD1 has received beacon requests broadcasted by the neighboring external nodes LBD2 to LBDN. That is, there are other external nodes LBD2 to LBDN, which want to join the network domain M1 and broadcast the beacon requests within the first predetermined time T1.

(b) The received signal strength of the beacon requests sent from other external nodes LBD2 to LBDN, need to be greater than a predetermined value. In one embodiment, the predetermined value is −30 dBm (Decibel milliwatts).

When the first number $c_1$ is smaller than a value $w_1$, the first external node LBD1 broadcasts the beacon request. In one embodiment, the value $w_1$ is defined as 1. This means there are no other external nodes LBD2 to LBDN around the first external node LBD1 that satisfies the above conditions. In this case, the first external node LBD1 broadcasts the beacon request for joining the network domain M1 after the first predetermined time T1.

Referring to FIG. 4, each external node performs the steps S401 to S407 of FIG. 4.

In the step S401, the "ADPM-DISCOVERY.request" instruction is received.

In the step S402, the first timer unit and the first counter are initialized.

In the step S403, the first timer unit starts to count the time.

In the step S404, it is judged whether the first predetermined time is due. If not, the process goes to the step S404-1. If yes, the process goes to the step S405.

In the step S404-1, it is judged whether the conditions are satisfied. If not, the process goes to the step S404. If yes, the process goes to the step S404-2.

In the step S404-2, the first counter increases the first number $c_1$ by 1, and the process goes to the step S404.

In the step S405, it is judged whether the first number $c_1$ is smaller than the value $w_1$. If not, the process goes to the step S407. If yes, the process goes to the step S406.

In the step S406, the beacon request is broadcasted.

In the step S407, the method ends.

With the above-mentioned steps, if there are multiple external nodes, which want to join the same network domain, then when these external nodes are performing the bootstrap procedure, the beacon requests broadcasted in the network domain, can be decreased, therefore a lot of traffic generated from the beacon request storm can be reduced.

Figure 5:
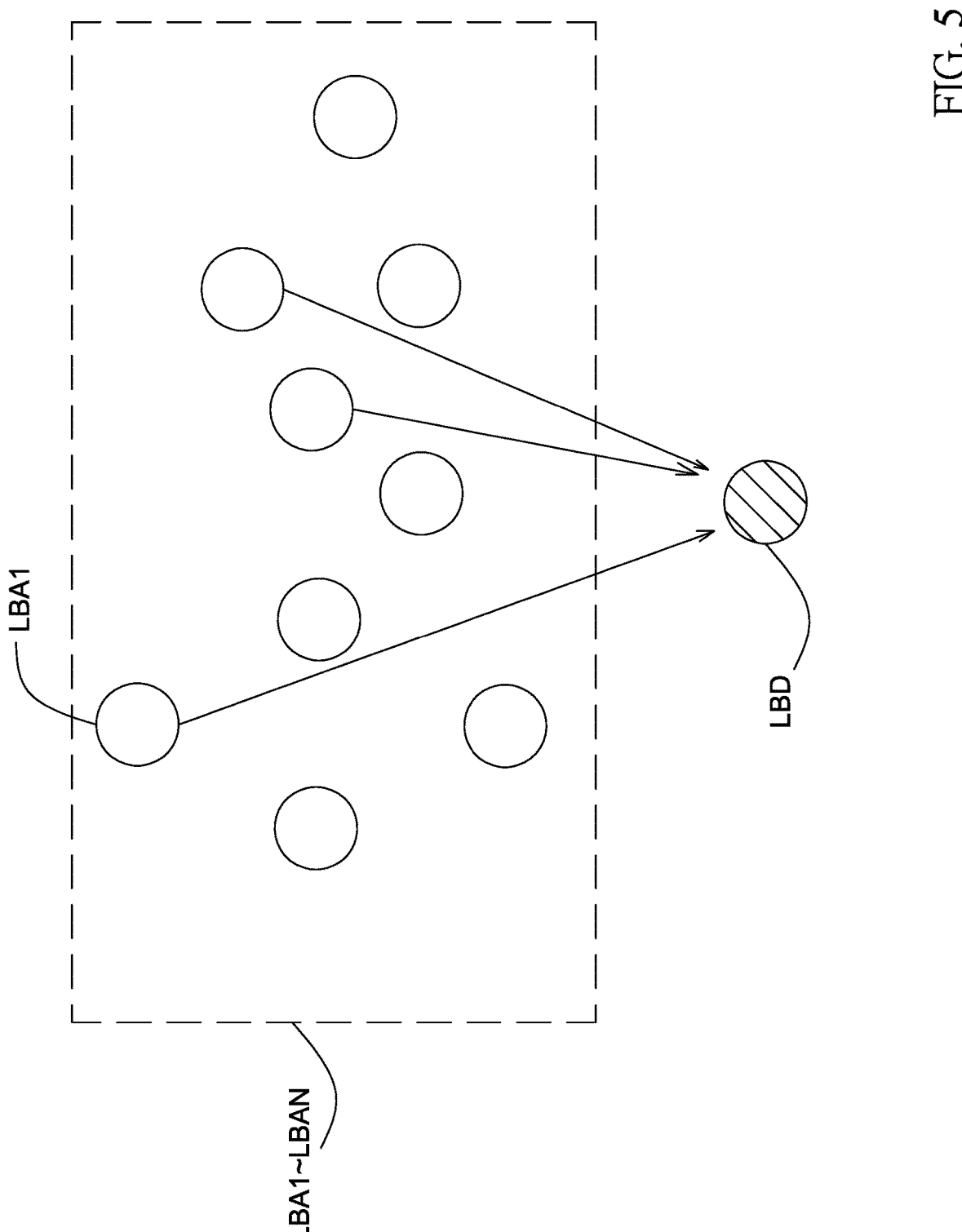
FIG. 5 is a schematic view showing an improved beacon storm of a bootstrap procedure in G3-PLC networks according to an embodiment of this disclosure.
Figure 6:
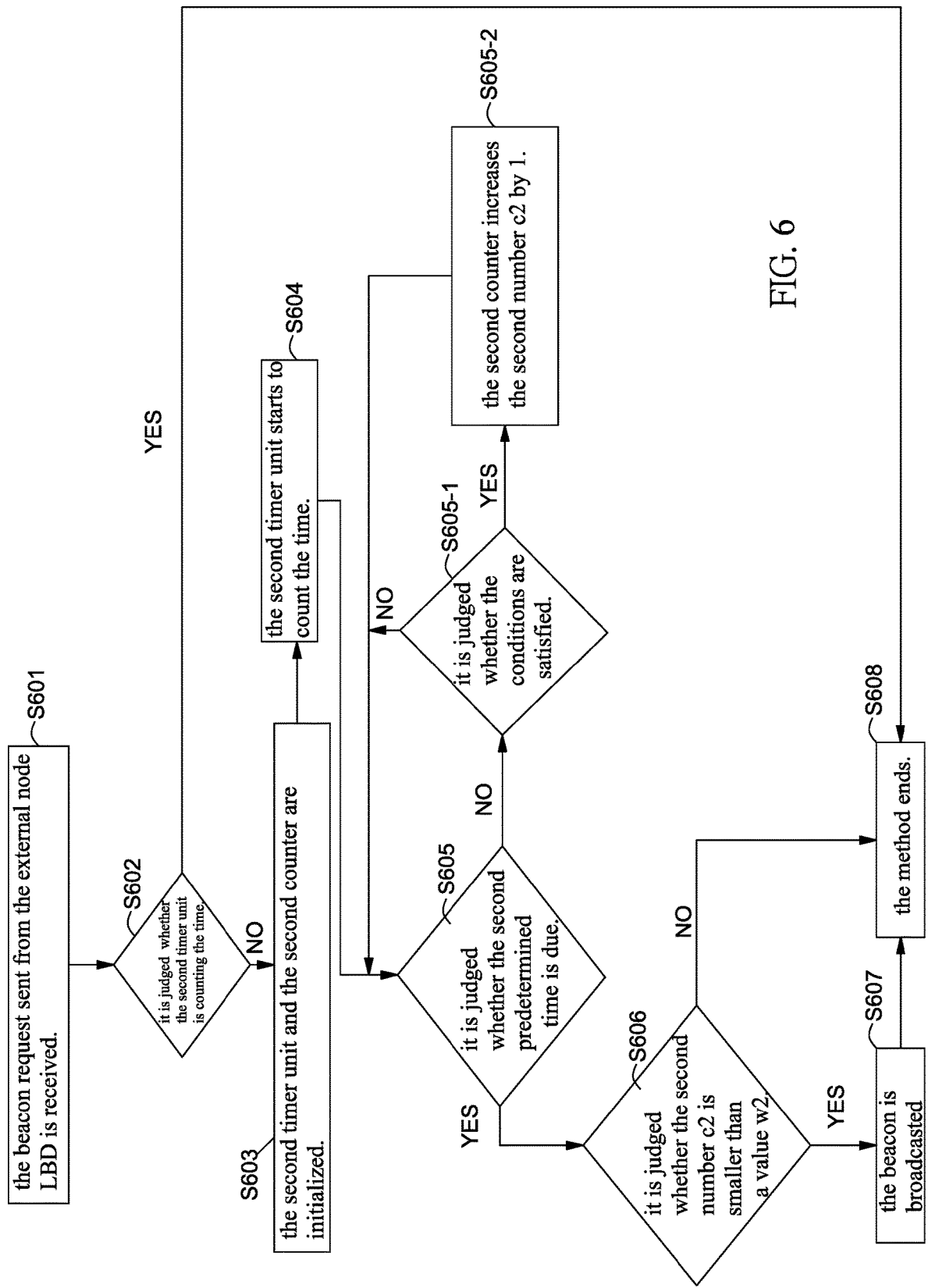
FIG. 6 is a schematic view showing a beacon transmission trickle mechanism.

Next, please refer to FIGS. 5 and 6. FIG. 5 is a schematic view showing an improved beacon storm of a bootstrap procedure in G3-PLC networks according to an embodiment of this disclosure. FIG. 6 is a schematic view showing a beacon transmission trickle mechanism. As mentioned hereinabove, after the first relay node LBA1 has received the beacon request sent from the external node LBD and a second timer unit of the first relay node LBA1 is not running yet, the first relay node LBA1 enables the beacon transmission trickle mechanism. FIG. 5 shows N relay nodes LBA1 to LBAN, and only the first relay node LBA1 is explained for the sake of conciseness.

In one embodiment, the beacon transmission trickle mechanism is executed by a beacon transmission trickle module. When the beacon transmission trickle mechanism is enabled, the first relay node LBA1 initializes the second timer unit and counts the time according to a second predetermined time T2. The range of the second predetermined time T2 is from 0 to the response time corresponding to the network domain search request instruction of the external node LBD. The second predetermined time T2 is a second random value whose range is from 0 to the sum of the response time multiplied by (1−K1) and the response time multiplied by K2 (T2=random[0, ADPM-DISCOVERY.request.duration*(1−K1)+ADPM-DISCOVERY.request.duration*K2]), where K2 is greater than or equal to 0, and smaller than 0.3. In one embodiment, the beacon transmission trickle module is executed by the adaptation sub-layer.

In one embodiment, the response time corresponding to the network domain search request instruction is implemented by the "ADPM-DISCOVERY.request.duration" parameter in the existing G3-PLC networks; and K1 is set as ranging from 0.4 to 0.6.

Before the second timer unit is expired and when the following conditions are both satisfied in the first external node LBA1, a second counter counts the number of beacons received by the first relay node LBA1, wherein the beacons are broadcasted from the neighboring relay nodes LBA2 to LBAN, and the second counter set a second number $c_2$ to the counted number: wherein the conditions (a) to (d) to be satisfied are described in the following.

(a) The first relay node LBA1 has received the beacons broadcasted by the neighboring relay nodes LBA2 to LBAN in response to the beacon requests sent from the external node LBD which wants to join the network domain M1. That is, there are other relay nodes LBA2 to LBAN which broadcast beacons in response to the external node LBD within the second predetermined time T2.

(b) The received signal strength of the beacons (the beacons from other relay nodes LBA2 to LBAN) received by the first relay node LBA1 need to be greater than a predetermined value. In one embodiment, the predetermined value is −30 dBm (Decibel milliwatts).

(c) The beacons received by the first relay node LBA1 must be in the same network domain. In one embodiment, the network domain address (or personal area network ID (PAN ID)) of the beacon needs to be the same as the network domain address of the beacon to be sent by the first relay node LBA1.

(d) A route cost of the beacon received by the first relay node LBA1 needs to be lower than the route cost of the beacon to be sent by the first relay node LBA1. That is, there is the other relay node LBD potentially providing lower route cost to perform bootstrap procedure.

When the second number $c_2$ is smaller than the value $w_2$, the first relay node LBA1 broadcasts the beacon in response to the external node LBD. In one embodiment, the value $w_2$ is defined as 5. That is, when there are fewer than 5 beacons sent from the other relay nodes around the first relay node LBA1 satisfying the above-mentioned conditions, the relay node LBA1 broadcasts the beacon in response to the external node LBD after the second predetermined time T2.

Referring to FIG. 6, each relay node satisfies the steps S601 to S608 of FIG. 6.

In the step S601, the beacon request sent from the external node LBD is received.

In the step S602, it is judged whether the second timer unit is counting the time. If not, the process goes to the step S603. If yes, the process goes to the step S608.

In the step S603, the second timer unit and the second counter are initialized.

In the step S604, the second timer unit starts to count the time.

In the step S605, it is judged whether the second predetermined time is due. If not, the process goes to the step S605-1. If yes, the process goes to the step S606.

In the step S605-1, it is judged whether the conditions are satisfied. If not, the process goes to the step S605. If yes, the process goes to the step S605-2.

In the step S605-2, the second counter increases the second number c2 by 1, and then the process goes to the step S605.

In the step S606, it is judged whether the second number c2 is smaller than a value w2. If not, the process goes to the step S608. If yes, the process goes to the step S607.

In the step S607, the beacon is broadcasted.

In the step S608, the method ends.

With the above-mentioned steps, when there are many relay nodes in the same network domain, and some of the relay nodes can suppress broadcasting beacons which is in response to the same one or more external nodes, therefore a lot of traffic generated by the beacon storm can be reduced.

In summary, this disclosure provides a method for reducing traffic of a bootstrap procedure and therefore solving the problem of a lot of traffic generated from the beacon request storm or the beacon storm.

What is claimed is:

1. A method for reducing traffic of a bootstrap procedure in G3-PLC networks, the method comprising:

a network domain where there is a first relay node; and a first external node and enabling a beacon request transmission trickle mechanism according to a network domain search request instruction;

wherein after the first relay node has received a first beacon request, and before a beacon transmission timer of the first relay node starts to count, the first relay node enables a beacon transmission trickle mechanism according to the first beacon request.

2. The method according to claim 1, wherein the beacon request transmission trickle mechanism comprises:

when the adaptation sub-layer in the first external node receives the network domain search request instruction from an upper layer, the first external node counts the number of second beacon requests broadcasted by a second external node around the first external node within a first predetermined time and set a first number to the counted number.

3. The method according to claim 2, wherein the beacon request transmission trickle mechanism comprises: the first external node receives the second beacon request broadcasted by the second external node; and a received signal strength of the second beacon request needs to be greater than a predetermined value, while a first counter in the first external node counts the number of the second beacon requests as the first number within the first predetermined time.

4. The method according to claim 3, wherein there is a response time which is carried in the network domain search request instruction of the first external node; and the first predetermined time is a first random value whose range is from 0 to the response time multiplied by K1, where K1 ranges from 0.4 to 0.6.

5. The method according to claim 4, wherein when the first number is smaller than 1, the first external node transmits the first beacon request.

6. The method according to claim 5, wherein the beacon transmission trickle mechanism comprises: the first relay node receives a first beacon broadcasted by an neighboring second relay node in response to the first beacon request, a received signal strength of the first beacon needs to be greater than a predetermined value, and the second relay node and the first relay node must be in the same network domain; the route cost of the first beacon needs to be lower than the route cost of the beacon to be sent by the first relay node; and a second counter in the first relay node counts a number of the first beacons as a second number within a second predetermined time.

7. The method according to claim 6, wherein the range of the second predetermined time is from 0 to the response time corresponding to the network domain search request instruction of the first external node, and the second predetermined time is a second random value whose range is from 0 to the sum of the response time multiplied by (1−K1) and the response time multiplied by K2, where K2 is greater than or equal to 0, and smaller than 0.3.

8. The method according to claim 7, wherein when the second number is smaller than 5, the first relay node transmits a second beacon in response to the first beacon request.

9. The method according to claim 6, wherein the network domain address of the first beacon is the same as the network domain address of the beacon to be sent by the first relay node.

* * * * *